A. K. STROH.
NUT LOCK.
APPLICATION FILED OCT. 4, 1919.

1,400,387. Patented Dec. 13, 1921.

Inventor
A. K. Stroh
By Chandlee Chandlee
Attorneys

UNITED STATES PATENT OFFICE.

ARTHUR K. STROH, OF CADILLAC, MICHIGAN.

NUT-LOCK.

1,400,387.  Specification of Letters Patent.  Patented Dec. 13, 1921.

Application filed October 4, 1919. Serial No. 328,505.

*To all whom it may concern:*

Be it known that I, ARTHUR K. STROH, a citizen of the United States, residing at Cadillac, in the county of Wexford, State of Michigan, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks and particularly to an improved locking washer.

One object of the present invention is to provide a novel and improved washer which when driven toward the work by the nut will automatically lock itself in the threads of the bolt.

Another object is to provide a novel and improved device of this character which is arranged to be coupled to the nut and be rotated on the bolt thereby so that backing off of the nut is prevented.

Other objects and advantages will be apparent from the following description when taken in connection with the accompanying drawing.

Referring particularly to the accompanying drawing, 10 represents a bolt which is disposed through a piece of work or support 11, and in connection with which my improved locking washer is used.

Figure 1:
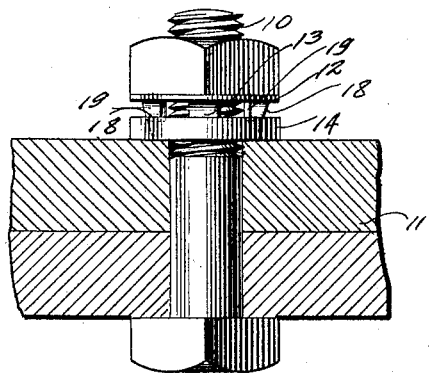
Figure 1 is a side elevation of a bolt, locking washer, and work, showing the application of the invention.
Figure 2:
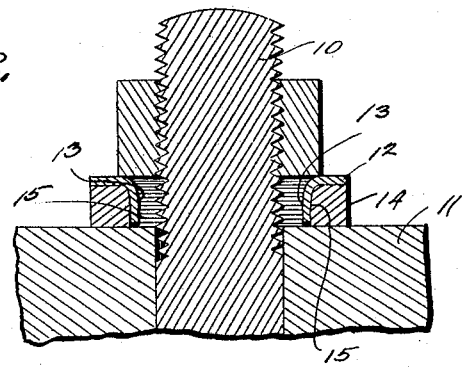
Fig. 2 is a sectional view taken longitudinally through the center of the bolt and transversely through the nut, and the washers, to show the engagement of the tongues of one washer in the recesses of the other washer.
Figure 3:
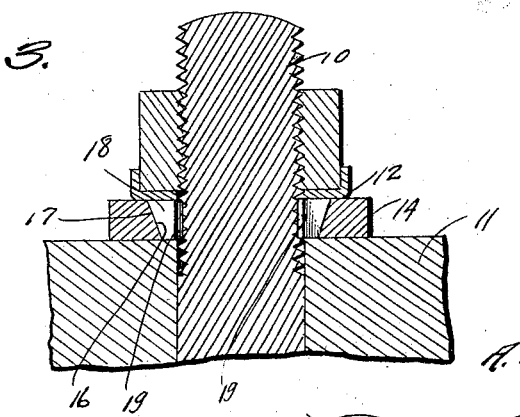
Fig. 3 is a sectional view taken through the same parts but at right angles thereto, to show the action and position of the locking wedges.

Engaged on the bolt, against the support 11, is a washer plate 12 from the wall of the central opening of which are struck out the diametrically opposite tongues 13. Also engaged on the bolt, outwardly of the washer 12, is a second heavier washer plate 14, the wall of the central opening of which is formed with diametrically opposite recesses 15 in which are received the before-mentioned tongues 13, whereby the two washers are coupled together and rotate simultaneously. In the wall of the central opening of the plate 14, at points ninety degrees from the recesses 15, are the recesses 16, the outer wall of each of which is inclined, as shown at 17, and disposed in each of the recesses or notches 16 is a wedge key 18. The inner longitudinal edge portion of each of the keys is formed with a biting edge 19 which is adapted to bite into the threads of the bolt, and to be driven into the said recesses by pressure of the nut thereagainst and against the washer plate 12. It will be readily seen, from an inspection of Fig. 3, that as the nut forces the plate 12 toward the plate 14, the ends of the wedge keys, being engaged against the adjacent face of the washer plate 12, will be pressed by the washer plate 12, and the keys driven back into the notches 16, with the result that their biting edges will be advanced toward the center of the opening of the washer plate and thus bite into the threads of the bolt.

After the parts have been thus operated, to force the wedges into biting engagement with the threads of the bolt, the opposite side portions of the washer 12 are bent to engage against the opposite side faces of the nut, thus firmly locking the washers to the bolt and to the nut, with the result that no relative rotation of the nut, washers, and bolt, can take place, either forwardly or backwardly.

What is claimed is:

1. A nut lock including a bolt and a nut, a pair of washers engaged on the bolt, one of the washers having diametrically opposite pairs of recesses in the wall of its opening, the other washer being engaged by the nut and having tongues engaged in one pair of said recesses, the outer end wall of each of the said other recesses being inclined longitudinally of the axis of the central opening of the washer, the sides of the last-named washer being arranged to be bent outwardly of the nut, and a wedge key in each of the second pair of recesses and having a longitudinal-knife edge on its exposed face, said wedge key having its inclined face slidably engaged with the outer wall of the recess and movable by compression between the first washer and nut to dispose the knife edge in biting engagement with and transversely of the threads of the nut.

2. A locking device for a bolt and nut comprising a plate having a bolt receiving opening therethrough with recesses in its wall and which recesses have their outer end walls inclined in the direction of the thickness of the plate, and a wedge key disposed in each of said recesses and each having a longitudinal knife edge directed inwardly toward the center of the opening of the plate and parallel with the axis of the opening, the inclined face of each of the keys engaging the inclined wall of a recess and arranged to be moved inwardly by a nut to force its knife edge into biting engagement with and transversely of the threads of a bolt.

In testimony whereof, I affix my signature, in the presence of two witnesses.

ARTHUR K. STROH.

Witnesses:
  LIZZIE STROH,
  FRED C. WETMORE.